United States Patent
Hillen et al.

(10) Patent No.: US 8,642,923 B2
(45) Date of Patent: Feb. 4, 2014

(54) WELD DATA ACQUISITION

(75) Inventors: Edward D. Hillen, Painesville, OH (US); Dmitry Brant, Mayfield Heights, OH (US); Stephen R. Cole, University Heights, OH (US); Stephen M. Kainec, South Euclid, OH (US)

(73) Assignee: Lincoln Global, Inc., City of Industry, CA (US)

( * ) Notice: Subject to any disclaimer, the term of this patent is extended or adjusted under 35 U.S.C. 154(b) by 281 days.

(21) Appl. No.: 12/786,804

(22) Filed: May 25, 2010

(65) Prior Publication Data

US 2010/0230393 A1   Sep. 16, 2010

Related U.S. Application Data

(62) Division of application No. 11/532,131, filed on Sep. 15, 2006, now abandoned.

(51) Int. Cl.
    *B23K 9/10*   (2006.01)
(52) U.S. Cl.
    USPC .................................. 219/137.7; 219/130.1
(58) Field of Classification Search
    USPC ........... 219/130.1, 130.5, 130.33, 136, 137.7
    See application file for complete search history.

(56) References Cited

U.S. PATENT DOCUMENTS

| | | | |
|---|---|---|---|
| 4,918,517 A * | 4/1990 | Burgoon | 348/90 |
| 5,278,390 A | 1/1994 | Blankenship | |
| 5,283,418 A * | 2/1994 | Bellows et al. | 219/130.01 |
| 5,416,299 A | 5/1995 | Tabata et al. | |
| 5,808,885 A | 9/1998 | Dew et al. | |
| 6,002,104 A | 12/1999 | Hsu | |
| 6,046,431 A * | 4/2000 | Beattie | 219/124.34 |
| 6,188,041 B1 | 2/2001 | Kim et al. | |
| 6,441,342 B1 * | 8/2002 | Hsu | 219/130.01 |
| 6,570,130 B1 | 5/2003 | Kooken et al. | |
| 6,624,388 B1 | 9/2003 | Blankenship et al. | |
| 6,797,921 B1 | 9/2004 | Niedereder et al. | |
| 7,064,290 B2 | 6/2006 | Blankenship et al. | |
| 7,132,623 B2 | 11/2006 | DeMiranda et al. | |
| 2005/0023253 A1 | 2/2005 | Houston et al. | |
| 2005/0252898 A1 | 11/2005 | Blechinger et al. | |
| 2007/0182420 A1 * | 8/2007 | Buda | 324/522 |

FOREIGN PATENT DOCUMENTS

| | | |
|---|---|---|
| EP | 911107 | 4/1999 |
| EP | 1380377 | 1/2004 |

OTHER PUBLICATIONS

International Search Report and Written Opinion from PCT/US07/076596 dated Dec. 17, 2007.
National Instruments brochure, Customer Solutions, Monitoring Arc Welding Applications at ABB, by Jonas Uller et al., 2 pgs. 2002.
Office action from U.S. Appl. No. 11/532,131 dated Aug. 21, 2008.
Response to Office action from U.S. Appl. No. 11/532,131 dated Dec. 3, 2008.

(Continued)

*Primary Examiner* — Henry Yuen
*Assistant Examiner* — Ayub Maye
(74) *Attorney, Agent, or Firm* — Calfee, Halter & Griswold LLP

(57) ABSTRACT

A weld data acquisition system collects data from the weld controller according to user selected collection parameters. The weld data acquisition system is able to transmit the data at high frequency to a weld data software utility that provides a user interface.

18 Claims, 6 Drawing Sheets

(56) References Cited

OTHER PUBLICATIONS

Office action from U.S. Appl. No. 11/532,131 dated Jun. 12, 2009.
Response to Office action from U.S. Appl. No. 11/532,131 dated Aug. 12, 2009.
Office action from U.S. Appl. No. 11/532,131 dated Sep. 4, 2009.
Response to Office action from U.S. Appl. No. 11/532,131 dated Oct. 30, 2009.
Advisory action from U.S. Appl. No. 11/532,131 dated Dec. 10, 2009.
Notice of Appeal from U.S. Appl. No. 11/532,131 dated Jan. 11, 2010.
Advisory Action from U.S. Appl. No. 11/532,131 dated Feb. 8, 2010.
Pre-Appeal Brief Request and accompanying Reasons for Requesting Pre-Appeal Brief Review from U.S. Appl. No. 11/532,131 dated Mar. 11, 2010.
Notice of Panel Decision from Pre-Appeal Brief Review from U.S. Appl. No. 11/532,131 dated Apr. 28, 2010.
Withdrawal of Appeal from U.S. Appl. No. 11/532,131 dated May 27, 2010.
Notice of Abandonment from U.S. Appl. No. 11/532,131 dated Jun. 11, 2010.

\* cited by examiner

WELD DATA ACQUISITION

RELATED APPLICATIONS

This application is a divisional application of U.S. Ser. No. 11/532,131, filed Sep. 15, 2006, the entire disclosure of which is incorporated herein by reference in its entirety.

TECHNICAL FIELD

The invention relates in general to the field of welding and more particularly to the field of monitoring various parameters of arc welding processes.

BACKGROUND

As welding processes become increasingly complex, the monitoring of these processes has become more and more challenging. Voltage and current are precisely controlled to achieve an optimal weld based on work piece characteristics, welding environment, and the anticipated use of the final product. According to complex welding control programs, supplied voltage and/or current are varied at high frequency and as such require monitoring techniques capable of capturing such high frequency changes. One method for compiling complex weld programs is described in U.S. Pat. No. 5,278,390, which is assigned to the assignee of the present application, and incorporated herein by reference in its entirety. An example of a voltage waveform generator that is capable of regulating welding supply voltage to match a target waveform is described in U.S. Pat. No. 7,064,290, which is assigned to the assignee of the present application, and incorporated herein by reference in its entirety. In addition, the characteristics of each weld may vary from work piece to work piece due to feedback control of the weld process. Therefore it is beneficial to monitor weld data from each work piece and handle the relatively large quantities of data that are generated in an efficient manner.

The acquisition of data from welding processes is necessary in many situations. For example, during the development of a new weld control algorithm, the weld engineer will monitor the current, voltage, and other weld parameters to glean helpful insight into the operation of the welding system. The weld data also and provides information about the nature of the weld being achieved during execution of the control algorithm. In many industries, such as the aerospace industry, it is becoming increasingly common for manufacturers to collect and archive weld data for each weld performed during the production of components. The weld data is associated with a given component serial number. The weld data may be accessed and analyzed later in the event that a weld anomaly is observed in a given component. The weld data may be correlated with weld data from previously manufactured components as part of a quality control program.

With the improvements in the programmability and control of welding systems, it has become advantageous to be able to remotely control one or more welding systems with a centralized weld controller. Weld data from these welding systems would also then need to be collected by the remote weld controller. An example of a welding system that employs a remote weld controller to control a plurality of welding systems is described in U.S. Pat. No. 6,624,388, which is assigned to the assignee of the present application, and incorporated herein by reference in its entirety.

SUMMARY

A weld data acquisition system that collects data from the weld controller according to user selected collection parameters and is able to transmit the data at high frequency facilitates efficient weld data acquisition.

An apparatus is provided for transmitting weld data obtained from a weld control system that controls voltage or current output by a welder during welding according to a weld control algorithm based on observed voltage and current values. A plurality of weld data channels are operatively coupled to the weld control system to carry data corresponding to the observed voltage and current values. The weld data channels also carry data corresponding to one or more algorithm component values created by the weld control algorithm, such as, for example, target levels for welding parameters. In addition, the weld data channels can carry data from an external or peripheral device such as, for example, a digital camera. An input selector selects a subset of the plurality of weld data channels for transmission and a weld data sampler samples data from the selected weld data channels and outputs the sampled data. A data transmitter, such as, for example, an Ethernet streaming output engine, transmits the sampled data.

A user interface may be provided through which a user selects the subset of the plurality of weld data channels. The user interface may include a data channel configuration interface that is configured to accept and communicate one or more data sampling parameters, such as, for example, a preferred sampling rate or data resolution, to the weld data sampler so that the weld data sampler samples the data from the selected weld data channels according to the data sampling parameters. It may be advantageous for the data channel configuration interface to be configured to present to the user an available bandwidth for transmission of data. The data channel configuration interface may also be configured to accept and communicate a data collection trigger corresponding to a threshold value for data from at least one of the selected weld data channels such that the weld data sampler is prompted by occurrence of the data collection trigger to output sampled data. The user interface may be generated by a set of computer-executable instructions stored on one or more computer readable media.

A weld data channel database may be present in communication with the input selector that stores an identifier associated with each weld channel available for sampling by the weld data sampler. The input selector selects weld data channels that have identifiers stored in the database. Other optional features include a weld data buffer that receives weld data from the weld data sampler and accumulates the weld data for transfer to the weld data transmitter and a weld data optimizer that receives data from the weld data sampler and configures the data for transmission by the transmitter. The weld data optimizer may organize the weld data from the weld data sampler such that a minimal number of bits is required to represent the weld data.

Accordingly a method is provided that samples and transmits data from a weld control system that controls voltage or current output by a welder during welding according to a weld control algorithm based on observed voltage and current values. A list of weld data channels that carry weld data values is provided, including voltage and current values and control algorithm component values. One or more selected weld data channels and configuration information associated with each of the selected weld data values is received. The configuration information corresponds to one or more preferred sampling parameters, such as, for example, a preferred sampling rate. The selected weld data values are sampled at a first sample rate and the sampled weld data values are filtered according to the configuration information and transmitted, for example, by an Ethernet streaming output engine.

The method may include the step of organizing the sampled data values into a data structure that minimizes a number of bits required to represent the data. It may be advantageous to select a preferred sampling rate that is lower than the frequency with which the weld controller samples the observed current and voltage values. The method may also include periodically accumulating and transmitting the filtered weld data values. A graphic user interface may be provided by the method for presenting available weld data channels and receiving selected weld data channels and configuration information. The step of transmitting the filtered weld data may be performed in response to the occurrence of one or more trigger conditions corresponding to threshold values for one or more of the selected weld data values.

Further, computer-readable media are provided that have computer-executable instructions stored thereon for performing the method steps outlined above to sample and transmit data from a weld control system.

A method and computer-readable media having computer-executable instructions for performing the method are also provided for acquiring data from a weld control system that controls voltage or current output by a welder during welding according to a weld control algorithm based on observed voltage and current values. A user interface is provided for presenting a set of available weld data types available for sampling. The weld data types include observed voltage and current values and control algorithm component values. The user interface also is configured to receive a set of selected weld data types and configuration information corresponding to preferred sampling parameters for each selected weld data type. The method receives weld data from the weld control system and decodes the received weld data according to the selected weld data types and configuration information for presentation. The user interface may also include providing a user interface for accepting a preferred sampling rate and/or one or more triggering conditions that signal the weld control system to commence data collection.

DETAILED DESCRIPTION

The monitoring of weld processes is often performed using external sensing hardware such as voltage sensing leads and current shunts. The data from the sensing hardware is collected by data analysis software such as LAbVIEW®. The use of external sensing hardware presents several disadvantages. The weld process generates considerable electrical interference, which makes it difficult to obtain reliable measurements of the weld voltage and current with external means. The external hardware is unable to detect the parameters that are set by the weld control program so the external hardware cannot determine what the target value for voltage or current is at any given time. Finally, the use of external sensing hardware makes monitoring of remote welding processes difficult. Therefore, it is beneficial to utilize a data acquisition system that accesses data directly from the weld controller without the need for external sensing hardware and to enable user configuration of data collection to better manage the quality and quantity of data collection.

Figure 1:
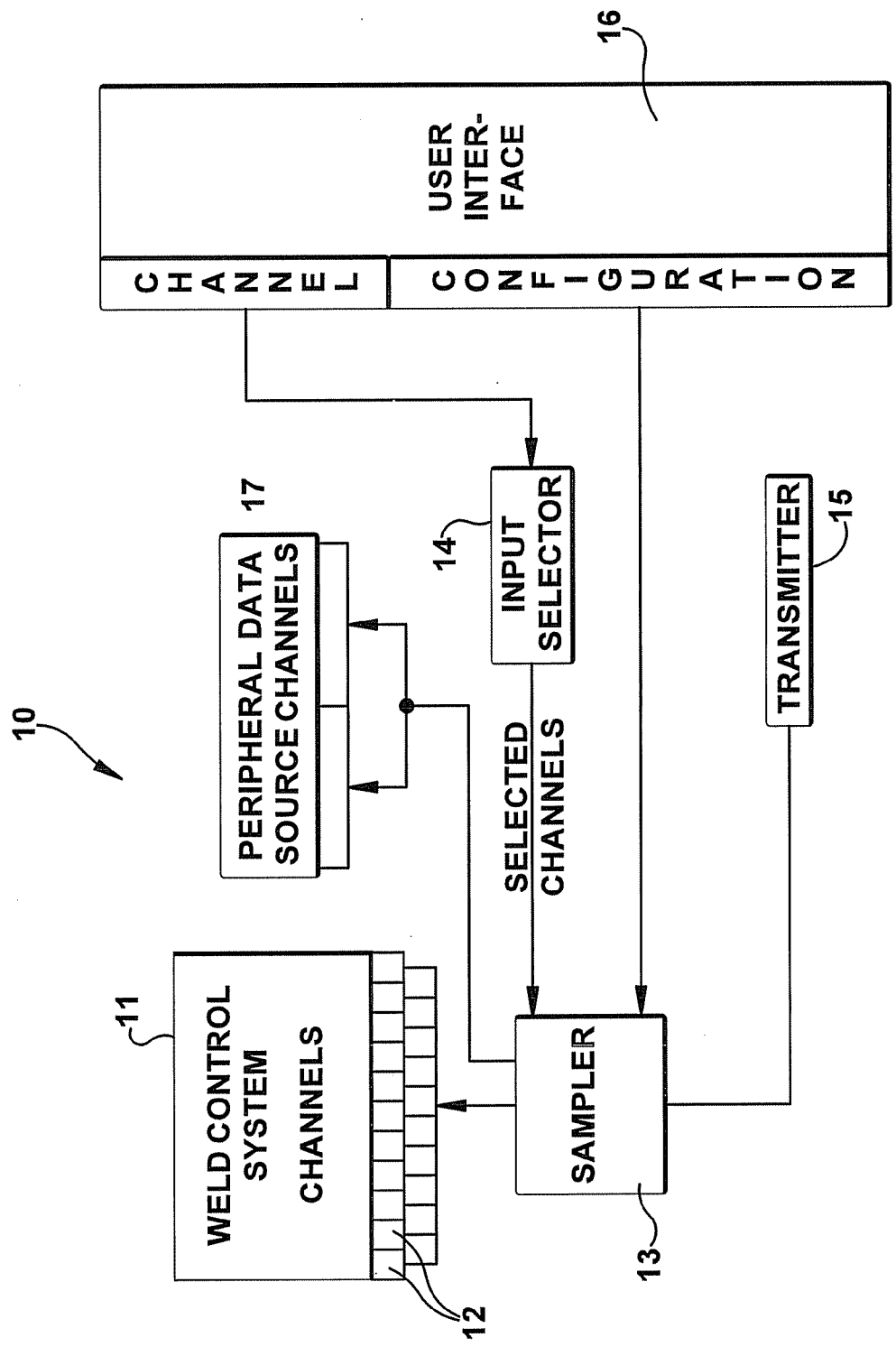
FIGS. 1 and 2 are block diagrams that schematically illustrate a weld data acquisition system constructed in accordance with an embodiment of the present invention.

FIG. 1 is a schematic block diagram that presents an overview of a weld data acquisition system 10 that can be used to transmit data from a weld control system 11. The weld control system includes a wide range of data channels 12 that are routinely accessed by the weld control system during welder operation. An input selector 14 selects one or more of the data channels 12 for transmission. In addition, one or more peripheral data sources 17, such as a digital camera that captures images of the weld arc, can be made accessible to the input selector and treated as additional data channels that can selected. The images from the camera can then be synchronized with the other weld data for analysis purposes. Many other devices that are not directly associated with the welding processes such as environmental sensors are contemplated as potential peripheral data sources 17.

A data sampler 13 acts on data from the data channels to filter out un-selected channels to be sent on to a transmitter 15. The data sampler 13 may also configure the data from the selected channels to alter data parameters such as sampling rate. An optional user interface may also be provided to allow a user to select data channels and input acquisition parameters according to which the sampler 13 filters data from the weld control system 11.

Figure 2:
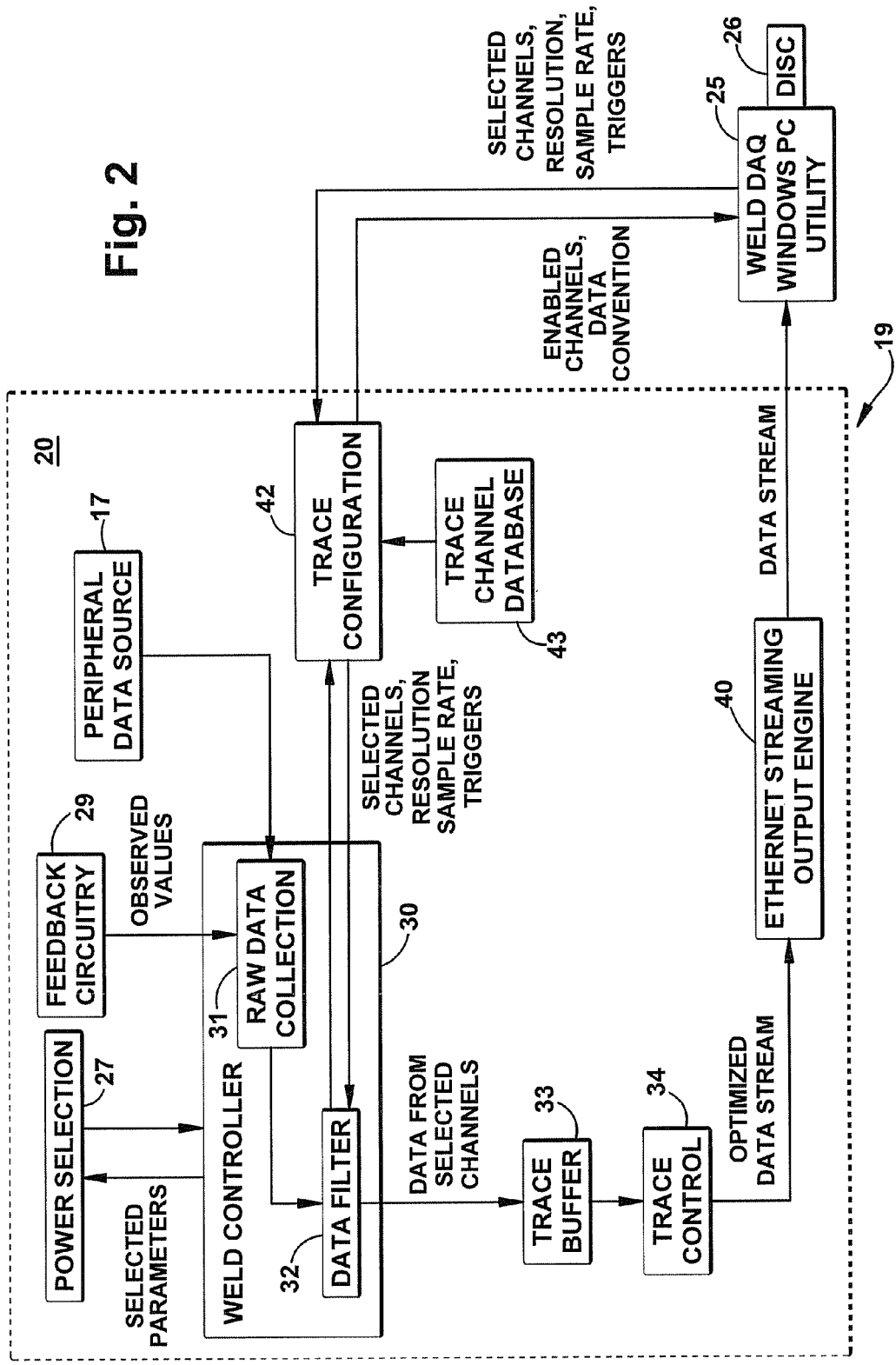

Referring now to FIG. 2, a schematic block diagram of an exemplary weld data acquisition system 19 is shown. Various software implemented functional components are shown in block form in FIG. 2 and the physical location of the various blocks is intended only to illustrate a flow of data between the functional components and not to indicate a particular location of residence on the control board itself. The system 19 includes a control board 20 that houses a weld controller 30 that controls a particular welding electrode or set of electrodes. Examples of typical weld controllers can be found in the patents mentioned in the Background. The weld data acquisition system also includes a weld data acquisition utility software application 25 that can be run on a personal computer or other compatible computing device. The weld data acquisition utility software application may be in communication with an external disc 26 or other storage means for storing data acquired by the weld data acquisition system. Generally speaking, the weld data acquisition utility software application 25 provides a user friendly interface for a user to configure data acquisition parameters and for presenting the acquired data to the user. The weld controller gathers the data as part of its weld control function and then configures the data for output to the weld data acquisition utility software application according to the specified data acquisition parameters.

The control board 20 includes a programmable microprocessor that includes inputs, outputs, and storage for the instructions necessary to program and execute the weld control algorithm. The weld controller 30 controls the weld process according to the weld control algorithm and monitors observed voltage, current, and possibly electrode feed rate, through feedback circuitry as part of the execution of the weld control algorithm. The data from the feedback circuitry is received by the weld controller, shown schematically as raw data collection 31, and is used to control the welding process. The sampling of the feedback data is performed by the weld controller in a manner that limits the effects of electrical interference caused by the welding process to provide relatively clean data. The data from the feedback circuitry is sampled at a relatively high sampling rate, such as 120 khz.

This high sampling rate generates large quantities of data which in the past have proven to be difficult to manage and store.

The weld controller controls the welding according to the weld control algorithm. Within the algorithm, internal algorithm components such as timers and calculated quantities are created and maintained. In many welders, the algorithm is constructed as a series of welder states that each correspond to a given mode of welder operation. As described in more detail in U.S. Pat. No. 5,278,390, which was identified in the Background, the weld algorithm is constructed by creating a state diagram that outlines the desired sequence of welder operating modes, referred to as states, that are necessary to achieve the desired weld. Each state may include such parameters as a ramp rate for current or providing a step change in voltage. The algorithm may move between states based on various parameter conditions such as timers or limits on current and voltage. Information regarding the current state in which the welder is operating can be valuable because it gives an indication of the target values for the weld control parameters. This state information is available for monitoring as part of the described data acquisition system.

Various other software components within the microprocessor are shown schematically as blocks in FIG. 2. A trace configuration module 42 serves as the interface between the weld controller 30 and the weld data acquisition utility software application 25. A trace channel database 43 is stored that lists the available data channels that can be monitored as well as a range of possible data acquisition parameters such as maximum sampling rate for each parameter. A data filter 32, shown for purposes of this description within the weld controller 30 receives configuration parameters from the trace configuration module 42 and filters the raw feedback data according to the parameters. A trace buffer 33 accumulates data from the data filter, which is output at the machine operating frequency, in this example 120 khz. The trace buffer transfers the accumulated data to a trace control module 34. The trace control module packages the data to optimize it for transmission by the output engine 40, which in the described system is an Ethernet streaming output engine. For example, the trace control module 34 may "bit-pack" the data to reduce the transmission of data bits that do not carry any useful information, such as may occur when the user has selected a lower resolution for a given data value so that not as many bits are need to represent the data's value. The output engine is operatively connected to the weld data acquisition utility software application 25, such as a by a wireless connection or a hard wired connection. The weld data acquisition utility software application 25 decodes the bit-packed data based on the selected weld data channels and configuration. This information is available from the trace configuration module 42 and is referred to as "data convention" in FIG. 2.

Figure 3:
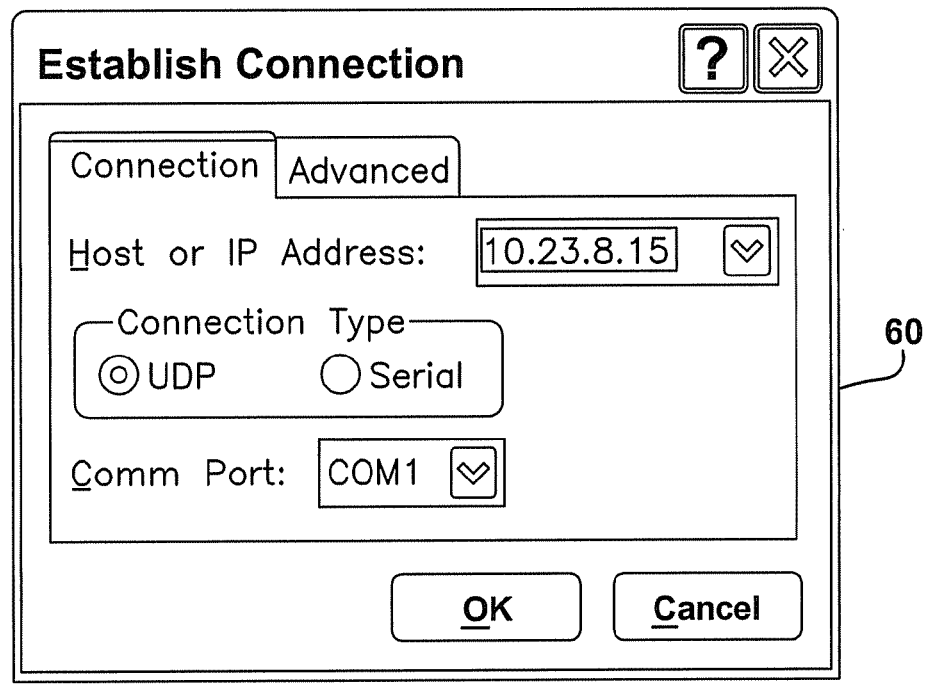
FIGS. 3-6 are illustrations of graphic user interfaces presented by an embodiment of the present invention.

Depending on the input capabilities of the computing device that is running the weld data acquisition utility software application, the application may accept data from a number of weld controllers. When multiple weld controllers are being monitored by the application, the application prompts the user with an IP address screen 60 shown in FIG. 3 to identify a particular weld controller by inputting an IP address and connection protocol. Once the connection is made, the user is presented with an interface screen such as those shown in FIGS. 4-6. It will be apparent to one of skill in the art that the particular arrangement of the various components and the overall appearance of the screen can vary significantly without affecting the functionality of the data acquisition system. The user interface screen 50 has three main options, the "trace setup" screen shown in FIGS. 4 and 5, a "review data" screen shown in FIG. 6, and an "oscilloscope" screen that is similar in appearance to the "review data" screen and displays data values real-time instead of presenting data stored from prior welder operation.

Figure 4:
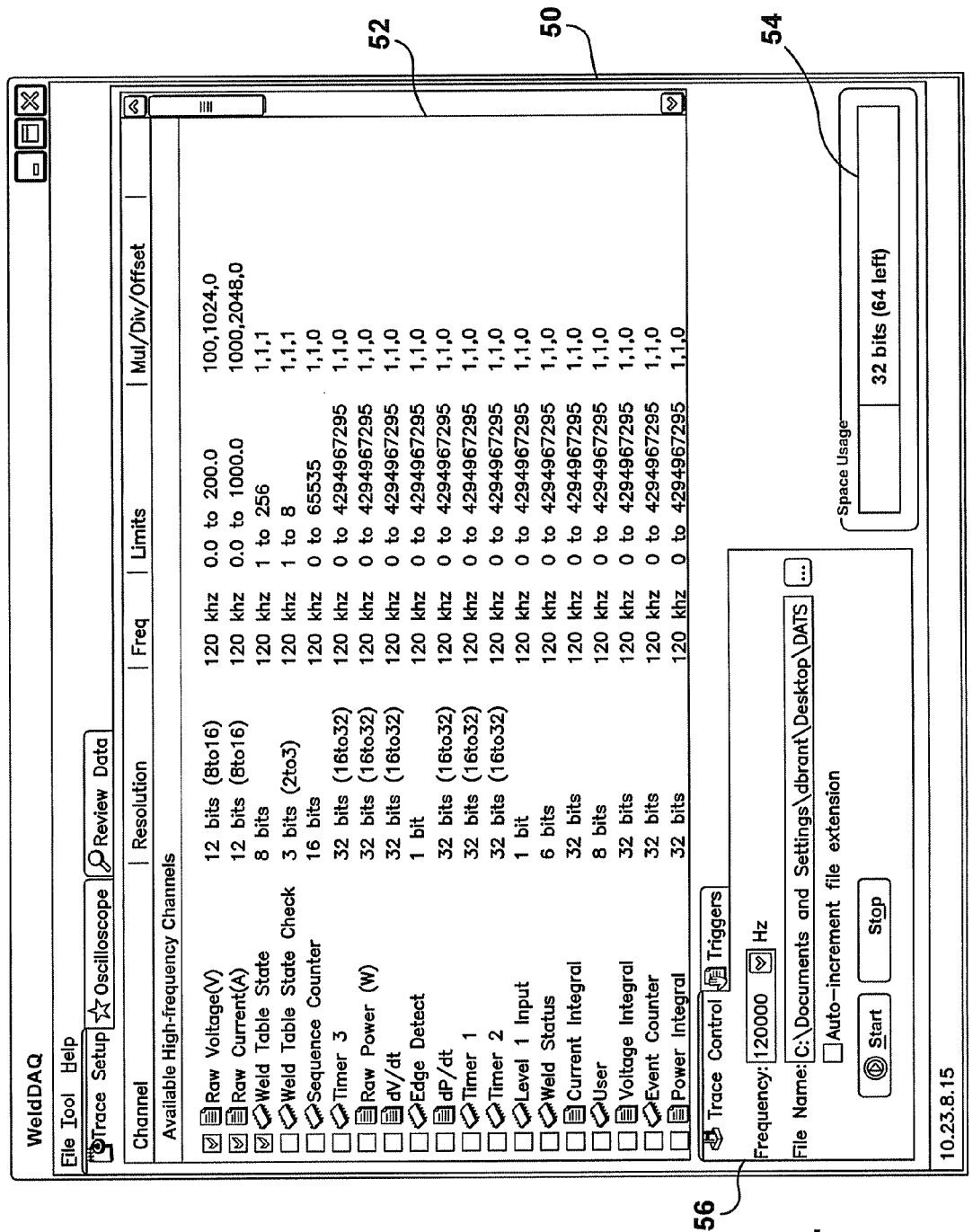
Figure 5:
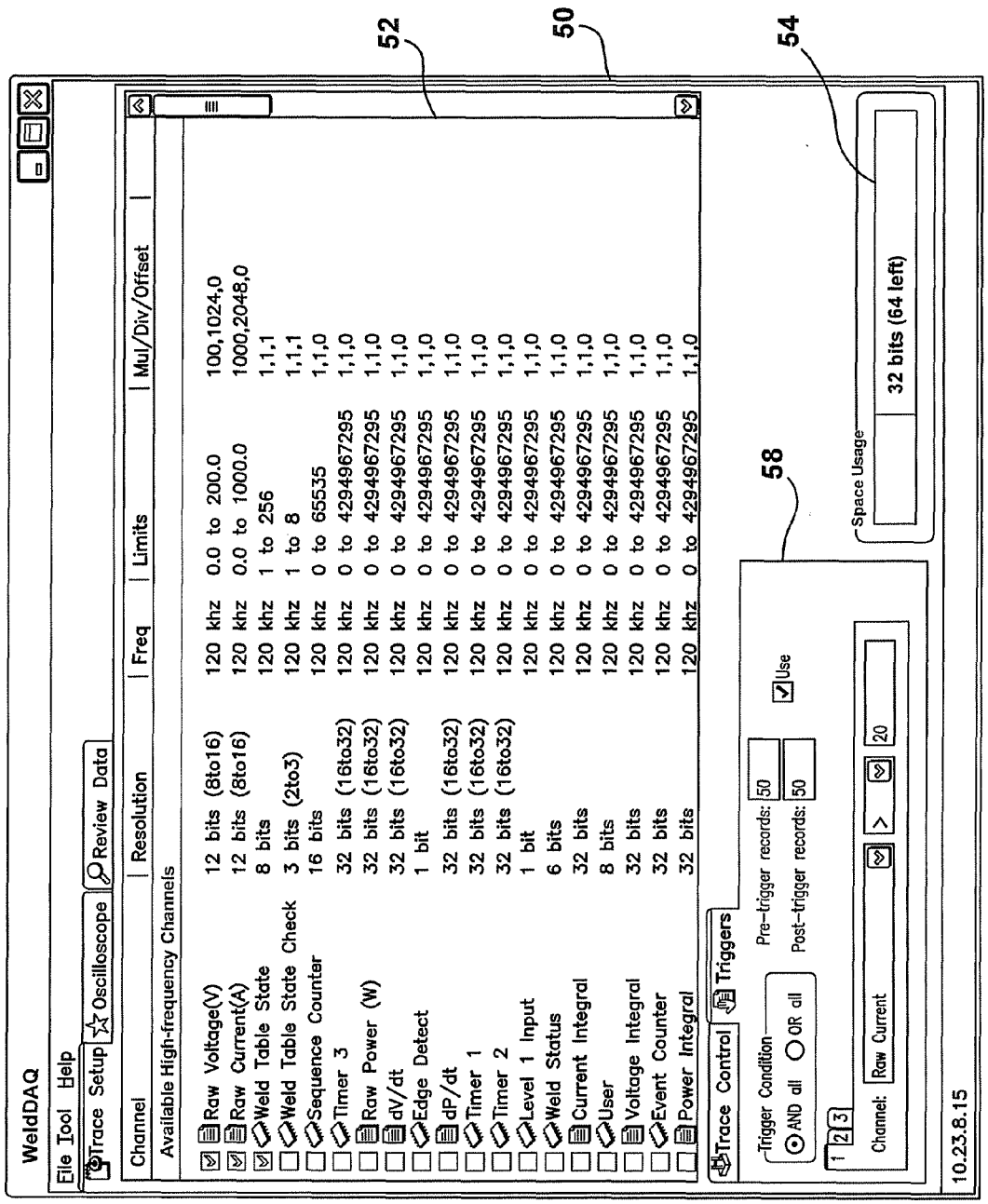

Referring now to FIGS. 4 and 5, a channel selection window 52 is shown in which a user may select a number of desired data channels for monitoring by checking a box in front of each channel name, in FIGS. 4 and 5 raw voltage, raw current, and weld table state, which denotes the present state in the weld algorithm, are selected for monitoring. For each selected channel a configuration window 56 allows the user to input a desired sample rate and data destination. As the user selects channels, a bandwidth indicator 54 tracks how much of the available bandwidth remains. The remaining bandwidth is calculated based on the bit-packing that will be used by the trace control module to package the data for transmission. Therefore, if the user reduces a sample rate, the decrease in bandwidth usage will be reflected in the bandwidth indicator 54. FIG. 5 illustrates an additional option available for data collection. A trigger setup window 58 can be used to input trigger conditions that prompt the weld controller to begin sending data to the trace buffer. In the example shown in FIG. 5, one of the trigger conditions is when the raw current exceeds 20 amps. Other trigger conditions can be set by accessing tab 2 or 3 which correspond to the other selected data channels. In the example case, all of the trigger conditions must be met, but an OR option is available in which case if any of the trigger conditions is met, data transmission begins. The user also inputs a number of records before and after the trigger event to be transmitted. All of the information input by the user is received by the trace configuration module 42 (FIG. 2) and applied by the data filter 32 during data acquisition.

Figure 6:
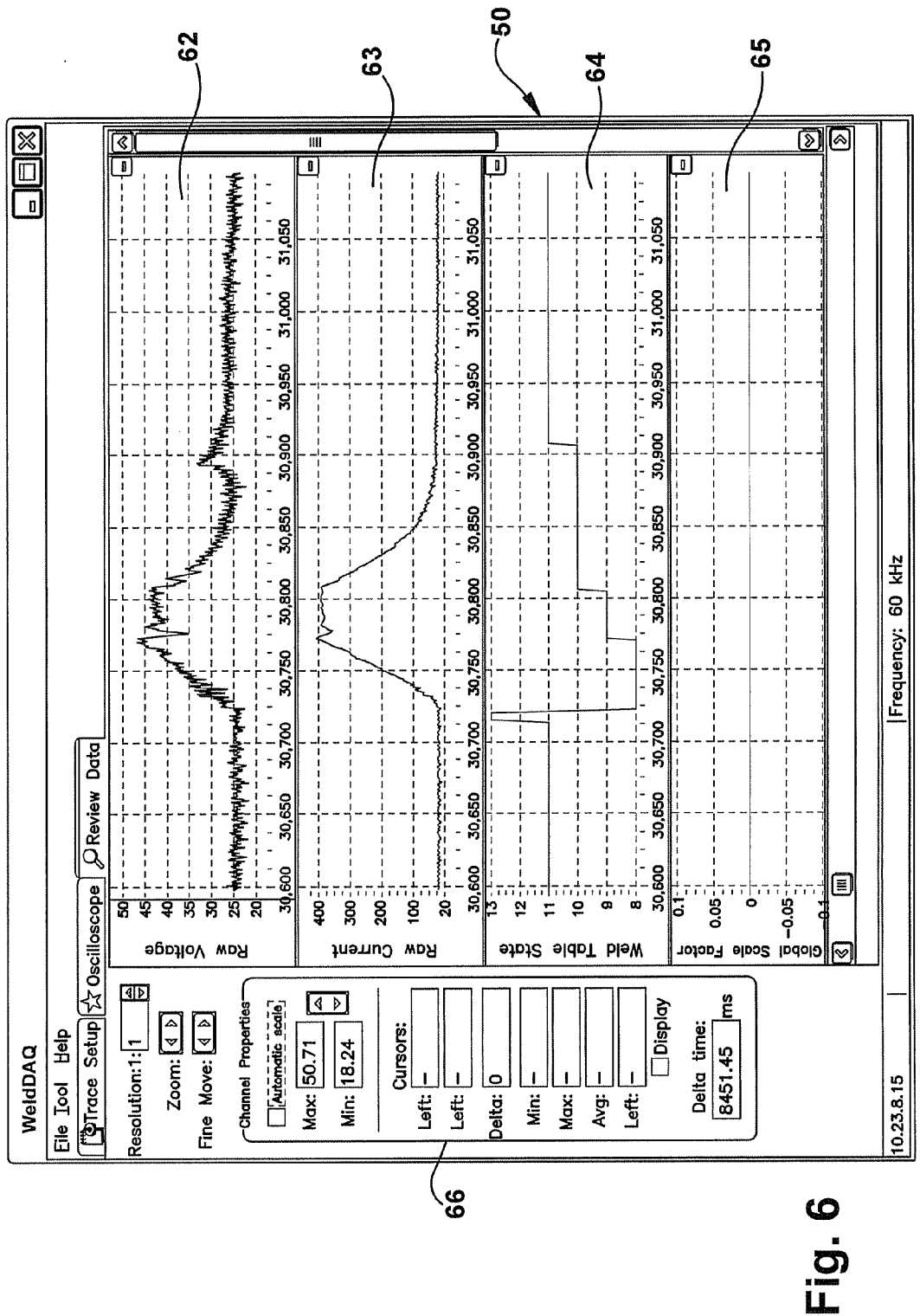

FIG. 6 shows the user interface screen 50 when the "review data" tab is selected. The data acquired from the weld controller is displayed as a function of time in multiple oscilloscope type windows 62-65. The user may navigate through the screen and configure the display for each window using the channel properties window 66. The user may, for example, increase or decrease resolution or manipulate a cursor to determine data values. As already discussed, the data acquisition system can also be operated in oscilloscope mode in which data from the output engine is displayed as it is received.

Figure 7:
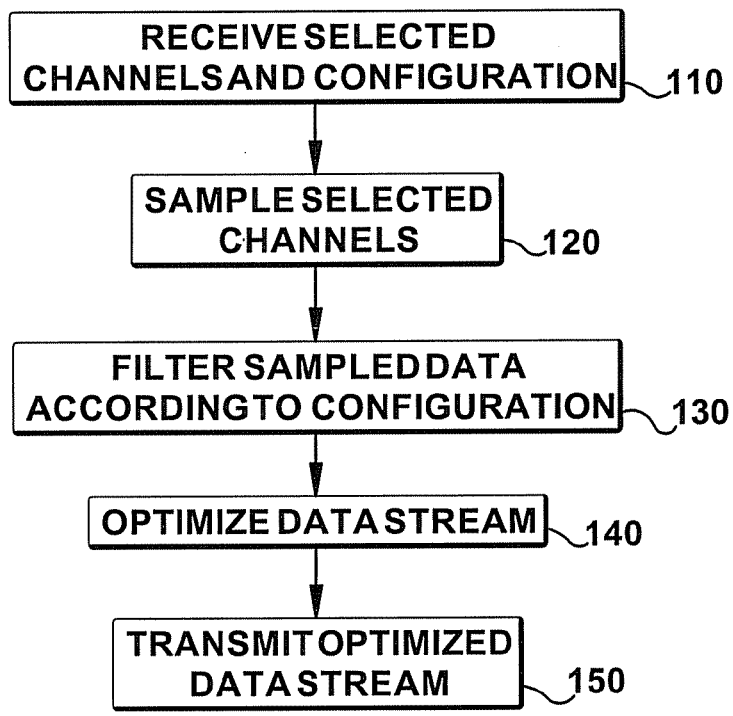
FIG. 7 is a flowchart outlining a method for transmitting weld data according to an embodiment of the present invention.

FIG. 7 outlines a method that can be performed by the weld data acquisition system to provide configured data in an efficient manner to the weld data acquisition utility software application 25. At 110, the selected data channels and configuration parameters are received. At 120 the selected channels are sampled and at 130 the sampled data is filtered according to the configuration parameters. At 140 and 150 the filtered data is optimized and transmitted to the weld data acquisition utility software application.

As can be seen from the foregoing description, providing configurable data acquisition capabilities as part of a weld control system facilitates efficient data collection. Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrations as described. Rather, it is intended that the scope of the invention be determined by the appended claims. Furthermore, the preceding description is not meant to limit the scope of the invention. Rather, the scope of the invention is to be determined only by the appended claims and their equivalents.

We claim:

1. A method of sampling data from a weld control system that controls voltage and current output by a welder during welding, the method comprising:
sampling the voltage output by the welder with feedback circuitry at predetermined time intervals during the welding to create voltage weld data;
providing the voltage weld data from the feedback circuitry to a weld controller;
sampling the current output by the welder with the feedback circuitry at predetermined time intervals during welding to create current weld data;
providing the current weld data from the feedback circuitry to the weld controller;
capturing raw weld images during the welding with a peripheral data source;
providing the raw weld images from the peripheral data source to the weld controller;
synchronizing the raw weld images from the peripheral data source with the voltage weld data from the feedback circuitry and the current weld data from the feedback circuitry with the weld controller prior to filtering of the raw weld images and the voltage and current weld data with the weld controller.

2. The method of claim 1 further comprising sampling control algorithm states that set desired voltage and current output by the welder during welding to create state information and synchronizing the raw weld images with the state information prior to filtering of the raw weld images and the voltage and current weld data.

3. The method of claim 1 wherein the raw weld images are images of the weld arc.

4. The method of claim 3 further comprising sampling control algorithm states that set desired voltage and current output by the welder during welding to create state information and synchronizing the raw weld images with the state information prior to filtering of the raw weld images and the voltage and current weld data.

5. The method of claim 1 wherein the raw weld image is an mage taken with a camera.

6. A method of sampling data from a weld control system during welding, the method comprising:
sampling weld data values at predetermined time intervals during the welding with feedback circuitry;
providing the weld data values from the feedback circuitry to a weld controller;
capturing raw weld arc images during the welding with a peripheral data source;
providing the raw weld arc images from the peripheral data source to the weld controller;
synchronizing the raw weld arc images from the peripheral data source with the sampled weld data values with the weld controller prior to filtering of the raw weld arc images and the weld data values with the weld controller.

7. The method of claim 6 wherein said sampling weld data values comprises sampling the voltage output by the welder at predetermined time intervals during the welding.

8. The method of claim 6 wherein said sampling weld data values comprises sampling the current output by the welder at predetermined time intervals during welding.

9. The method of claim 6 wherein said sampling weld data values comprises sampling control algorithm states that set desired voltage and current output by the welder during welding.

10. The method of claim 6 wherein the raw weld arc image is taken with a camera.

11. An apparatus for obtaining weld data from a weld control system that controls voltage and current output by a welder during welding, the apparatus comprising:
feedback circuitry that includes a voltage weld data channel that is operatively coupled to the weld control system to carry voltage weld data corresponding to observed voltage values during welding;
said feedback circuitry includes a current weld data channel in the feedback circuitry that is operatively coupled to the weld control system to carry current weld data corresponding to observed current values during welding;
a digital camera that captures raw weld images during the welding;
a weld data sampler that samples the voltage weld data from the voltage weld data channel of the feedback circuitry, samples current weld data from the current weld data channel of the feedback circuitry, receives raw weld images from the digital camera, and synchronizes the raw weld images from the digital camera with the voltage weld data and the current weld data prior to filtering the raw weld images and the voltage and current weld data.

12. The apparatus of claim 11 wherein the weld data sampler samples control algorithm states that set desired voltage and current output by the welder during welding to create state information and synchronizes the raw weld images with the state information prior to filtering the raw weld images and the voltage and current weld data.

13. The apparatus of claim 11 wherein the raw weld images are images of the weld arc.

14. The apparatus of claim 13 wherein the weld data sampler samples control algorithm states that set desired voltage and current output by the welder during welding to create state information and synchronizes the raw weld images with the state information prior to filtering the raw weld images and the voltage and current weld data.

15. An apparatus for obtaining weld data from a weld control system that controls voltage and current output by a welder during welding, the apparatus comprising:
feedback circuitry that includes a weld data channel that is operatively coupled to the weld control system to carry weld data observed during welding;
a digital camera that captures raw weld arc images during the welding;
a weld data sampler that samples the weld data from the weld data channel of the feedback circuitry, receives raw weld arc images from the digital camera, and synchronizes the raw weld arc images from the digital camera with the weld data prior to filtering the raw weld arc images and the weld data.

16. The apparatus of claim 15 wherein the weld data channel is a voltage weld data channel that is operatively coupled to the weld control system to carry voltage weld data corresponding to observed voltage values during welding and the weld data sampler samples the voltage weld data from the voltage weld data channel and synchronizes the raw weld arc images with the voltage weld data prior to filtering the raw weld arc images and the weld data.

17. The apparatus of claim 15 wherein the weld data channel is a current weld data channel that is operatively coupled to the weld control system to carry current weld data corresponding to observed current values during welding and the weld data sampler samples the current weld data from the current weld data channel and synchronizes the raw weld arc images with the current weld data prior to filtering the raw weld arc images and the weld data.

18. The apparatus of claim 15 wherein the weld data channel is a state data channel that is operatively coupled to the weld control system to carry state data corresponding to control algorithm states that set desired voltage and current output by the welder during welding and the weld data sampler samples the state data from the state data channel and synchronizes the raw weld arc images with the state data prior to filtering the raw weld arc images and the weld data.

* * * * *